US008731868B2

(12) United States Patent
Janssens et al.

(10) Patent No.: US 8,731,868 B2
(45) Date of Patent: May 20, 2014

(54) TRANSFER PATH ANALYSIS

(75) Inventors: Karl Hans Bert Janssens, Kessel-lo (BE); Peter Paul Germain Mas, Kortenaken (BE); Peter Akos Gajdatsy, Leuven (BE); Herman Van Der Auweraer, Lubbeek-Linden (BE); Ludo Jean Pierre Gielen, Kessel-lo (BE)

(73) Assignee: LMS International NV, Leuven (BE)

( * ) Notice: Subject to any disclaimer, the term of this patent is extended or adjusted under 35 U.S.C. 154(b) by 318 days.

(21) Appl. No.: 12/432,395

(22) Filed: Apr. 29, 2009

(65) Prior Publication Data
US 2009/0276197 A1    Nov. 5, 2009

(30) Foreign Application Priority Data

May 1, 2008 (EP) .................................... 08155533

(51) Int. Cl.
*G06F 17/50* (2006.01)
*G06G 7/48* (2006.01)
*G06G 7/70* (2006.01)
*G06F 19/00* (2011.01)
*G01F 17/00* (2006.01)
*B60K 17/24* (2006.01)

(52) U.S. Cl.
USPC .......... 703/1; 703/7; 703/8; 701/111; 702/56; 180/381; 180/300

(58) Field of Classification Search
USPC .......... 703/7–8, 1; 180/300; 701/111; 702/56
See application file for complete search history.

(56) References Cited

U.S. PATENT DOCUMENTS

| 4,858,146 | A | * | 8/1989 | Shebini | 703/1 |
| 5,360,080 | A | * | 11/1994 | Yamazaki | 180/300 |
| 5,678,028 | A | * | 10/1997 | Bershteyn et al. | 703/22 |
| 6,090,148 | A | * | 7/2000 | Weber et al. | 703/8 |
| 6,101,432 | A | * | 8/2000 | Her et al. | 701/111 |
| 6,110,216 | A | * | 8/2000 | Weber et al. | 703/8 |
| 6,529,838 | B1 | * | 3/2003 | Horiuchi et al. | 702/56 |

(Continued)

FOREIGN PATENT DOCUMENTS

EP    1 855 270 A2    11/2007
JP    6-33981    2/1994

OTHER PUBLICATIONS

R. Citarella, L. Federico, A. Cicatiello, Modal acoustic transfer vector approach in a FEM-BEM vibro-acoustic analysis, Engineering Analysis with Boundary Elements, vol. 31, Issue 3, Mar. 2007, pp. 248-258, ISSN 0955-7997.*

(Continued)

*Primary Examiner* — Akash Saxena

(57) ABSTRACT

A method (200) for the characterization of vibrational and/or acoustic transfer path related data of a physical system (100) where vibration or acoustics may play a role. The method (200) has a step of receiving (210) input data for at least one input point of the physical system and/or response data for at least one response point of the physical system (100). The method (200) further has a step of receiving (220) at least one system response function between the at least one input point and the at least one response point indicative of the transfer of vibration and/or acoustic signals. The method (200) also has a step of applying (230) at least one parametric model characterising at least one load on the physical system as a function of the input data, where the parametric models are identified from the input data and/or response data and the physical system response functions.

8 Claims, 5 Drawing Sheets

(56) References Cited

U.S. PATENT DOCUMENTS

| | | | |
|---|---|---|---|
| 6,804,615 B2* | 10/2004 | Hyde | 702/56 |
| 6,871,133 B2* | 3/2005 | Togai et al. | 701/111 |
| 6,944,580 B1* | 9/2005 | Blume et al. | 703/1 |
| 7,542,887 B2* | 6/2009 | Brughmans et al. | 703/2 |
| 8,306,793 B2* | 11/2012 | Huang et al. | 703/2 |
| 2002/0183942 A1* | 12/2002 | Lafleur et al. | 702/56 |
| 2003/0154451 A1* | 8/2003 | Rassaian | 716/4 |
| 2010/0049475 A1* | 2/2010 | Cazals | 703/1 |
| 2010/0204965 A1* | 8/2010 | Ide et al. | 703/1 |
| 2011/0301929 A1* | 12/2011 | Huang et al. | 703/7 |

OTHER PUBLICATIONS

Analysis and Control of Vibrational Power Transmission to Machinery Supporting Structures Subjected to a Multi-Excitation System, Part I: Driving Point Mobility Matrix of Beams and Rectangular Plates; Y K Koh et al, Journal of Sound and Vibration 1996, pp. 469-493.*

Search report of European Patent Office relating to European Patent Application No. EP08155533.6-2213, Oct. 13, 2008.

* cited by examiner

TRANSFER PATH ANALYSIS

TECHNICAL FIELD OF THE INVENTION

The present invention relates to the field of vibrational and/or acoustic study or analysis of physical systems. More particular, the present invention relates to methods and systems for identifying vibrational and/or acoustic data in an object.

BACKGROUND OF THE INVENTION

Transfer Path Analysis (TPA), also referred to as Noise Path Analysis (NPA), is an experimental technique for identifying the vibro-acoustic transfer paths in a system, from the active system component(s), generating the structural and acoustic loads, through the physical connections and along airborne pathways, to the target point(s) at the passive system component(s) responding to these loads. The acoustic and vibration responses at the target point(s) are expressed as a sum of path contributions, each associated with an individual path and load. For example, for a pressure response $p(\omega)$ expressed in the frequency domain, this can be formulated as follows:

$$p(\omega) = \sum_{i=1}^{n} p_i(\omega) \quad [1]$$

with $p_i(\omega)$ the partial pressure contribution of path i, $\omega$ the frequency and n the number of paths. A similar equation can be written for the time domain.

The oldest approach to this problem was to use coherence analysis to identify the various contributions, with all problems related to separating partially correlated sources. In the late eighties, an alternative formulation making use of a source-system-receiver model was developed, expressing each of the partial response contributions as the result of an individual structural or acoustic load acting at a localized interface, and a system response to this interface load. This effectively corresponds to cutting the global system at the interface into an active part generating the interface load and a passive part reacting to the interface load. An example thereof is shown in FIG. 1. For structural loads, this cut typically corresponds to physical connection points (e.g. mounts, bushings, subsystem connections, etc.). For acoustic loads from vibrating surfaces or pulsations from nozzles or apertures, a discretisation by omni-directional volume acceleration point sources is usually applied.

This system approach allows making explicit each of the partial contributions as the result of a load acting at each contribution location and a system response function (SRF) between the load location and the considered target response. In case of a pressure response (e.g. interior noise, pass-by noise, etc.), the key formula for the pressure response $p(\omega)$ becomes $$p(\omega) = \sum_{i=1}^{n} SRF_i(\omega) * F_i(\omega) + \sum_{j=1}^{p} SRF_j(\omega) * Q_j(\omega) \quad [2]$$

with $F_i(\omega)$ (i=1, . . . , n) the structural loads or forces, $Q_j(\omega)$ (j=1, . . . , p) the acoustic loads, typically volume accelerations, and $SRF_i(\omega)$ and $SRF_j(\omega)$ the system response functions between the input loads and target. A similar equation can be written for vibration responses (e.g. seat vibration, steering wheel vibration, etc.). Concise visualizations of the transfer path contribution results allow quickly assessing critical paths and frequency regions, an illustration thereof shown in FIG. 4, and the separation into loads and noise transfer functions is the key to identify dominant causes and to propose solutions (e.g. act on specific load inputs, act on mount stiffness, act on specific system transfer, etc.).

The test procedure to build a conventional TPA model typically requires two basic steps: (i) identification of the operational loads during in-operation tests (e.g. run-up, run-down, etc.) on the road or on a chassis dyno; and (ii) estimation of the SRF's from excitation tests (e.g. hammer impact tests, shaker excitation test, etc.). The procedure is similar for both structural and acoustical loading cases, but the practical implementation is of course governed by the nature of the signals and the loads.

The estimation of the SRF's between input loads and target response(s) is probably the easiest to control well. The typical procedure is to dismount the active system before measuring the SRF's. In case of soft mount connections, one can also obtain good SRF measurements without disassembling the system. The SRF's can be measured either in a direct or reciprocal way. The use of reciprocal measurements (exciting at the target location(s), measuring the response at the interfaces) has two main advantages: (i) only one excitation is needed per target location while the direct approach requires one excitation per input load; (ii) the limited space at the path inputs can lead to direction errors in direct SRF measurements of up to 10 dB, which can be avoided when using reciprocal measurements.

The identification of the operational loads is the main accuracy factor. For the structural excitation case, there currently exist three ways to identify the forces.

The first approach is to measure the forces directly by using dedicated measuring devices such as load cells. But such direct measurement is up to now not possible in the majority of cases as the load cells require space and well-defined support surfaces, which often makes application impractical or even impossible without distorting the natural mounting situation.

In case that the active and passive structures are connected through soft mounts, the so-called mount stiffness method can be used. This method combines the differential operational responses across the mounts and the mount stiffness profiles to estimate the transmitted mount forces. For a mount i, this can be expressed mathematically as follows:

$$F_i(\omega) = K_i(\omega) * \frac{(a_{ai}(\omega) - a_{pi}(\omega))}{-\omega^2} \quad [3]$$

with $F_i(\omega)$ the mount force, $K_i(\omega)$ the mount stiffness profile and $a_{ai}(\omega)$ and $a_{pi}(\omega)$ the active and passive side mount accelerations. The mount stiffness method is a fast method, but its disadvantage is that accurate mount stiffness data are seldom available and furthermore depend on the load conditions and excitation amplitudes.

The third approach is the inverse force identification method which identifies the operational loads $F_i(\omega)$ (i=1, . . . , n) from closeby acceleration indicator responses $a_j(\omega)$ (j=1, . . . , v) at the passive system side, by multiplying these with the pseudo-inverse of the measured force-acceleration SRF matrix between all force inputs and indicator responses. Mathematically, this is as follows:

$$\begin{bmatrix} F_1(\omega) \\ F_2(\omega) \\ \vdots \\ F_n(\omega) \end{bmatrix} = \begin{bmatrix} SRF_{11}(\omega) & SRF_{21}(\omega) & \ldots & SRF_{n1}(\omega) \\ SRF_{12}(\omega) & SRF_{22}(\omega) & \ldots & SRF_{n2}(\omega) \\ \vdots & \vdots & \vdots & \vdots \\ SRF_{1v}(\omega) & SRF_{2v}(\omega) & \ldots & SRF_{nv}(\omega) \end{bmatrix}^{-1} \cdot \begin{bmatrix} a_1(\omega) \\ a_2(\omega) \\ \vdots \\ a_v(\omega) \end{bmatrix} \quad [4]$$

The matrix inversion is done frequency per frequency, e.g. as applied in EP-A-1855270. The number of indicator responses (v) must significantly exceed the number of forces (n), with a factor 2 as a rule of thumb, to minimize ill-conditioning problems when calculating the pseudo-inverse. Such approach of over-determination is well-described in literature. A serious drawback of this method is the need to perform a large number of SRF measurements to build the full matrix. The latter costs a lot of time and is a main bottleneck for industry.

Another approach is applied in U.S. Pat. No. 5,360,080. Here, optimum load ratios and phase differences between a basic engine mount and the other engine mounts are obtained and tabulated on the basis of empirically obtained transfer functions such as to minimize the vibration level at the vibration evaluation points. These optimum load ratios and phase differences are used as a basis for controlling the vehicle vibrations by adjustment of the mount stiffnesses.

Closely related to this approach is the method disclosed in patent JP-A-06033981 to optimize a vibration reducing by an actuator using the transfer function of a digital filter according to a signal related to the transmitted state of vibration.

Another approach for identifying noise transfer paths is to apply active load cancellation at one of the path inputs and measure the change in noise or vibration at the target(s). This approach, disclosed in patent EP0825358A1, is not so widely used.

Today, the main driver for innovations in TPA is the industry's demand for simpler and faster methods. Existing techniques like inverse load identification are very time-consuming. Several attempts have been made to speed up the TPA process. One of the striking examples is the recently developed Operational Path Analysis (OPA) approach. This approach attracts quite some attention as it requires only operational data measured at the path references (e.g. passive-side mount accelerations, pressures closeby vibrating surfaces, nozzles and apertures, etc.) and target point(s). No SRF's need to be measured. Essentially, it is a transmissibility method as known from structural dynamics, characterizing the co-existence relationship between the target response(s) and path references. This method is indeed very time-efficient, but has several limitations. One of the main limitations is the cross-coupling between the path references. Because of the modal behavior of the structure (resonances), a single force in one of the connection mounts causes vibrations at all path references. This cross-coupling effect easily leads to a false identification of significant paths and wrong engineering decisions. Next to this, the OPA method suffers from ill-conditioning problems related to estimating transmissibilities from operational data. These problems lead to unreliable transmissibility estimates in many cases (e.g. coherent inputs, limited number of orders in the data, etc.).

In view of the above limitations, there is still a need for good methods for obtaining vibrational and/or acoustic data.

SUMMARY OF THE INVENTION

It is an object of embodiments of the present invention to provide good apparatus or methods for obtaining vibrational and/or acoustical data. It is an advantage of embodiments according to the present invention that systems and methods are provided that allow obtaining vibrational and/or acoustical data in a fast but yet accurate way.

It is an advantage of embodiments according to the present invention that these allow balancing between speed of execution (e.g. measurement time, etc.) and accuracy (e.g. accuracy of path contribution results, accuracy of estimated loads, etc.). The more indicators that are measured and used in the analysis, the more robust the estimations can be and the better the accuracy will become, but the higher the measurement effort and time will be.

It is an advantage of embodiments according to the present invention that the measurement efforts for having appropriate input data can be small in comparison to the existing inverse load identification technique. Next to the operational in-situ measurements of path inputs and target response(s), methods and systems according to the present invention minimally require only one reciprocal SRF measurement per target point. Adding additional indicators for improving robustness may require additional SRF measurements, but this is still a small effort compared to the huge measurement efforts to build the full SRF matrix for inverse load identification.

It is an advantage of embodiments according to the present invention that the methods and systems do not require mount stiffness data. The latter is advantageous as these data are seldom available.

It is an advantage of embodiments according to the present invention that systems and methods are provided which result in numerically stable calculations, for example numerically stable estimation of parametric load models. It is an advantage of embodiments according to the present invention that ill-conditioning problems, as often occur in Operational Path Analysis (OPA), are seldom.

It is an advantage of embodiments according to the present invention that the parametric models being used may have a physically meaningful interpretation. It is an advantage of embodiments according to the present invention that these provide the ability for estimating e.g. the stiffness characteristics of the mounting elements from the vibrational and/or acoustic transfer path analysis measurement data. The latter may be useful for a number of applications.

The above objective is accomplished by a method and device according to the present invention.

The present invention relates to a method for characterisation of vibrational and/or acoustic transfer path related data of a physical system, the physical system comprising at least one input point and at least one response point, the method comprising receiving in-situ input data for at least one input point and/or response data for at least one response point of the physical system, receiving at least one system response function between the at least one input point and the at least one response point, and applying at least one parametric model characterising at least one load on the physical system as a function of said input data, whereby the parametric models are estimated from said input data and/or response data and on said physical system response functions. It is an advantage of embodiments according to the present invention that by applying parametric models characterising loads on the system, an efficient and accurate characterisation system can be obtained. It is an advantage of embodiments according to the present invention that the parametric models may have a physical meaning. It is an advantage of embodiments according to the present invention that the parametric models may allow determining other physical parameters of the system, such as for example stiffness of mounts.

The method may furthermore comprise determining the at least one load on the physical system based on said parametric model. It is an advantage of embodiments according to the present invention that determination of the loads on the physical systems can be obtained as output of the method.

The parametric model may comprise a plurality of model parameters, and determining the at least one load on the physical system may comprise determining values for the model parameters based on an expression correlating the at least one response on the one hand and a product of the at least one system response function with the parametric model for the at least one load on the other hand. It is an advantage of embodiments according to the present invention that for obtaining the transfer path related data, the mathematical problem suffers rarely of ill-conditioned problems.

The method may furthermore comprise determining transfer path contributions for at least one of said at least one response point. It is an advantage of embodiments according to the present invention that an efficient way for determining transfer path contributions is obtained.

The loads may comprise structural loads and/or acoustic loads. It is an advantage of embodiments according to the present invention that the method and system is widely applicable.

The path contributions may comprise structural and/or airborne paths. It is an advantage of embodiments according to the present invention that structural paths and airborne paths can be handled simultaneously as well as separately.

It is an advantage of embodiments according to the present invention that these can be based on target points, additional indicators or a combination of targets and additional indicators.

The parametric model may be a physical model of the physical system. It is an advantage of embodiments according to the present invention that the parametric model may be any suitable model expressing the load as function of the input variables, such as for example a single degree of freedom mount model, a constant point mobility model for acoustic loads, a band estimator model, etc.

Any of the type and characteristics of parametric model, the type and number of response data and application of either separate or simultaneous identification of structural and airborne contributions may be user-specified. It is an advantage of embodiments according to the present invention that methods are provided allowing a large degree of user-specification and therefore introducing a high level of selectivity of accuracy and efficiency.

The present invention also relates to a method for characterisation of vibrational and/or acoustic transfer path related data of a physical system, the physical system comprising at least one path input point and at least one response point, the method comprising:
 receiving in-situ path input data for at least one path input point and/or response data for at least one response point of the physical system,
 measuring and/or simulating at least one system response function between the at least one path input point and the at least one response point, and
 identifying at least one parametric load model characterising at least one path input load acting on the physical system as a function of said path input data, whereby the parametric load models are estimated from said path input data and/or response data and said physical system response functions.

The method furthermore may comprise determining the at least one path input load based on said parametric load model and said path input data.

The parametric load model can comprise a plurality of model parameters, and wherein determining the at least one path input load on the physical system comprises determining values for said model parameters based on an expression correlating the at least one response on the one hand and a product of the at least one system response function with the path input data for the at least one path input point on the other hand.

The method may furthermore comprise determining transfer path contributions for at least one of said at least one response point from said identified path input loads and said physical system response functions. In the method, the loads can, for example, comprise structural loads and/or acoustic loads. Also the path contributions may comprise structural and/or airborne paths. Preferably, the parametric load model is a physical model of the system (100). For example, any of the type and characteristics of the parametric load model, the type and number of response data and application of either separate or simultaneous identification of structural and airborne contributions can be user-specified.

The present invention also provides a characterisation system for characterising vibrational and/or acoustic transfer path related data of a physical system, the physical system comprising at least one path input point and at least one response point, the characterisation system comprising
 an input means adapted for receiving in-situ path input data for at least one path input point and/or response data for at least one response point of the physical system and for receiving at least one system response function between the at least one path input point and the at least one response point, and
 a processing means (320) adapted for identifying at least one parametric load model characterising at least one path input load acting on the physical system (100) as a function of said path input data, whereby the parametric load models are estimated from said path input data and/or response data and said physical system response functions.

The processing system furthermore may be adapted for determining the at least one path input load on the physical system based on said parametric load model and said path input data and/or for determining transfer path contributions for at least one of said at least one response point based on said identified path input loads and said physical system response functions.

The present invention also relates to a characterisation system for characterising vibrational and/or acoustic transfer path related data of a physical system, the physical system comprising at least one input point and at least one response point, the characterisation system comprising an input means adapted for receiving in-situ input data for at least one input point and/or response data for at least one response point of the physical system and for receiving at least one system response function between the at least one input point and the at least one response point, and a processing means adapted for applying at least one parametric model characterising at least one load on the physical system as a function of said input data, whereby the parametric models are estimated from said input data and/or response data and on said physical system response functions.

The processing system furthermore may be adapted for determining the at least one load on the physical system and/or for determining transfer path contributions for at least one of said at least one response point.

The present invention also provides a characterisation system for characterising vibrational and/or acoustic transfer path related data of a physical system, the physical system comprising at least one path input point and at least one response point, the characterisation system comprising an input means adapted for receiving in-situ path input data for at least one path input point and/or response data for at least one response point of the physical system and for receiving at least one system response function between the at least one path input point and the at least one response point, and a processing means adapted for identifying at least one parametric load model characterising at least one path input load acting on the physical system as a function of said path input data, whereby the parametric load models are estimated from said path input data and/or response data and said physical system response functions.

The processing system furthermore may be adapted for determining the at least one path input load on the physical system based on said parametric load model and said path input data and/or for determining transfer path contributions for at least one of said at least one response point based on said identified path input loads and said physical system response functions.

The present invention also relates to a computer program product adapted for, when executed on a computer, performing the method for characterization of vibrational and/or acoustic transfer path related data as set out above.

The present invention furthermore is related to a machine readable data storage device storing such a computer program product and/or the transmission of the computer program product over a local or wide area telecommunications network.

Particular and preferred aspects of the invention are set out in the accompanying independent and dependent claims. Features from the dependent claims may be combined with features of the independent claims and with features of other dependent claims as appropriate and not merely as explicitly set out in the claims.

The teachings of the present invention permit the design of improved consumer products, such as for example vehicles, compressors, etc.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
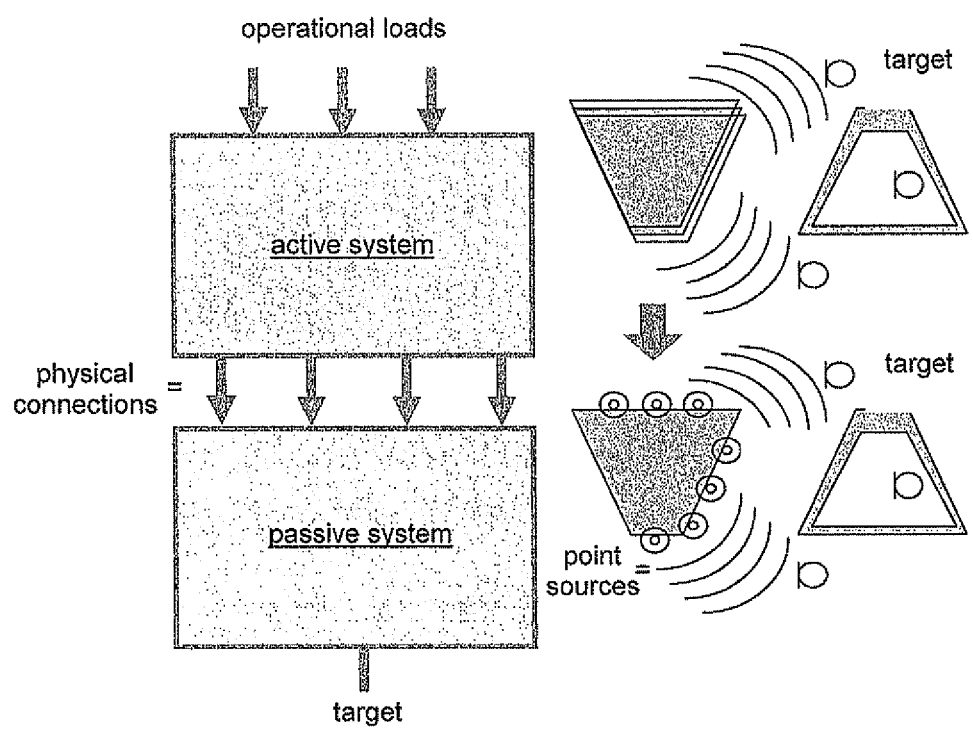
FIG. 1 is a schematic representation of the splitting of a system as can be used in a method for performing a Transfer Path Analysis.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

In the present application, the term "vibrational and/or acoustic transfer path related data" may refer to any type of data related to the transfer of acoustics or vibrations from a source to a receiver, such as for example but not limited to estimated loads, operational loads or transfer path contributions, but also mount stiffness profiles, etc. The term "input data" may be any data related to a source of vibrational and/or acoustic signals such as for example, the present invention not being limited thereby, a wheel or tire unbalance, a road input, engine related vibrational and/or acoustic signals, etc. An "input point" may comprise any point which is for the cause of this method considered or used as source point, such as for example a wheel or tire, an engine or points thereof, etc. An "input point" may be a point where vibrations, acoustic signals and/or even strains are induced or generated. The term "response data" may be any data related to a vibration, acoustic and/or mechanical signal at a target position, such as for example, the present invention not being limited thereby, shaking of a steering wheel, noise at ears, a rear-view mirror vibration, a strain, etc. It may also be any data related to indicator points which may be used e.g. to improve the accuracy and robustness of the estimations. The indicators may for example be points positioned close to the mount connections, allowing a separate identification of the structural loads without the need to consider airborne contributions.

The term "response point" may be any point of interest at which a user wants to obtain information regarding the vibration and/or acoustic signal generated, or any additional indicator point.

The term "physical system" relates to an interconnection of physical components that perform a specific function. These components may be electrical, mechanical, hydraulic, thermal and so forth or combinations thereof. In Transfer Path Analysis, the physical system under consideration can be a mechanical system. A mechanical system is a system of elements that interact on mechanical principles. It may be any system, such as for example: a transportation system, a road vehicle (e.g. car, SUV, truck, bus, motorcycle, tractor, etc.), a rail vehicle (e.g. train, tram, underground, etc.), an airborne vehicle (e.g. aircraft, helicopter, jet-fighter, satellite, space launcher, etc.), a waterborne vehicle (e.g. ship, submarine, etc.) or it can be industrial machinery and other equipment (e.g. weaving machine, compressor, generator, washing machine, dishwasher, refrigerator, HVAC equipment, gas turbine, wind turbine, chain saw, brush cutter, lawn-mower, drilling machine, printer, copy machine, vacuum cleaner, elevator, excavator, loader, etc.). It can also be a civil construction (e.g. theater, concert hall, industrial plant, tunnel, dam, bridge, office building, etc.). Any of these mechanical systems can have electronic (so-called mechatronic systems), hydraulic and (or) thermal components.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to a method for characterisation of vibrational and/or acoustic transfer path related data of a physical system. As indicated above, such a physical system may be any system, such as e.g. a consumer product like a car, a ground vehicle like e.g. a truck, bus, rail vehicle or tractor, an aeroplane, a spacecraft, industrial machinery, etc. Such a physical system comprises at least one input point and at least one response point. The method comprises receiving in-situ input data and/or response data regarding the physical system and receiving system response functions between at least one input point and at least one response point. The method also comprises applying parametric models characterising loads on the physical system as a function of signals at the at least one input point. The parametric models thereby are estimated from the input data and/or response data and the physical system response functions. Such parametric models may for example be physical models. It is an advantage of embodiments according to the present invention that the parametric models may be such that it takes in-situ information of the physical system as input, i.e. the input data and/or response data may be data measured in the system, e.g. during operation. The input therefore does not need to be based on a demounted physical system or a physical system in a lab environment. The latter furthermore has the advantage that a more accurate image of the sources of vibration and/or noise can be obtained.

Figure 2:
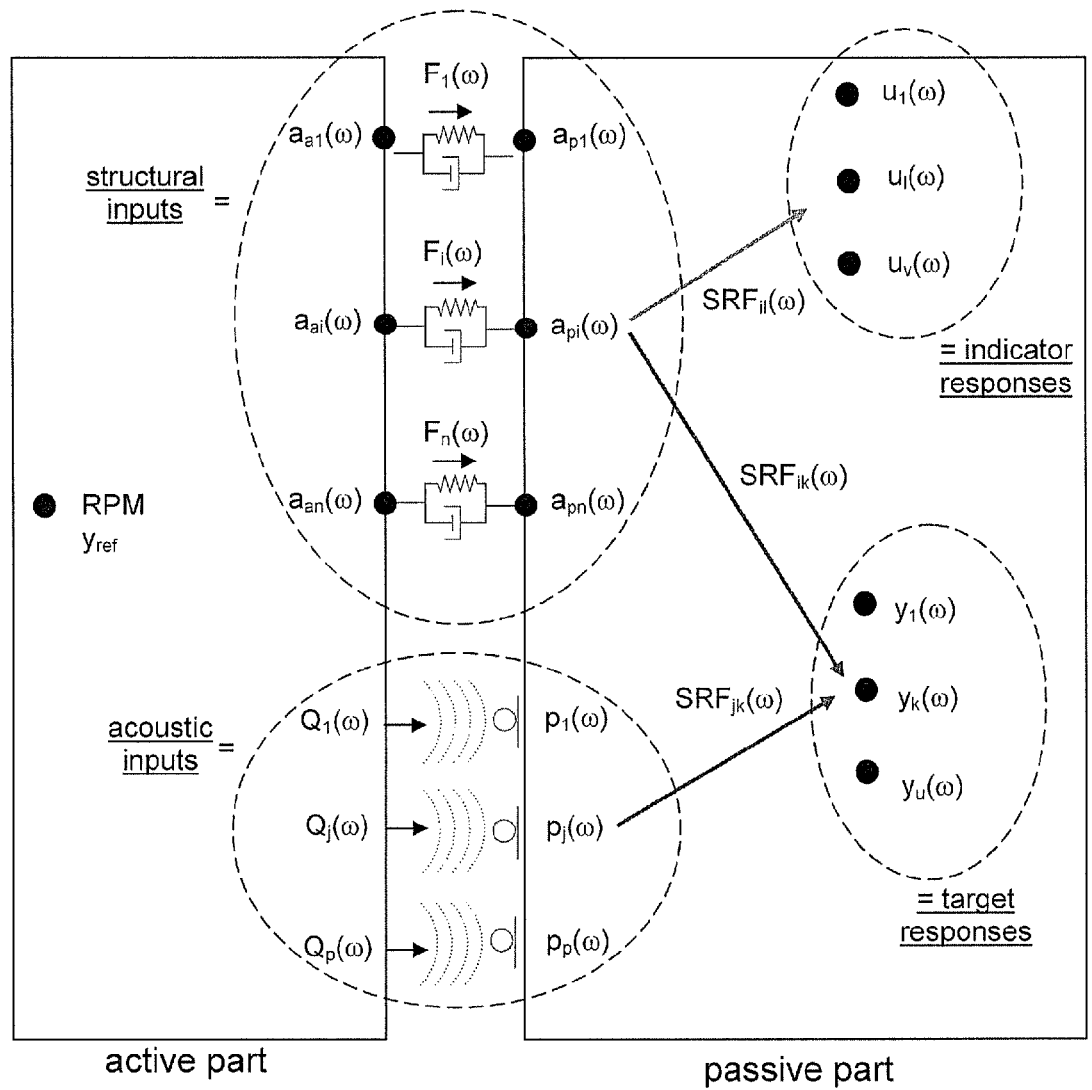
FIG. 2 is a schematic representation of a structure as can be dealt with using a method or system according to embodiments of the present invention.
Figure 3:
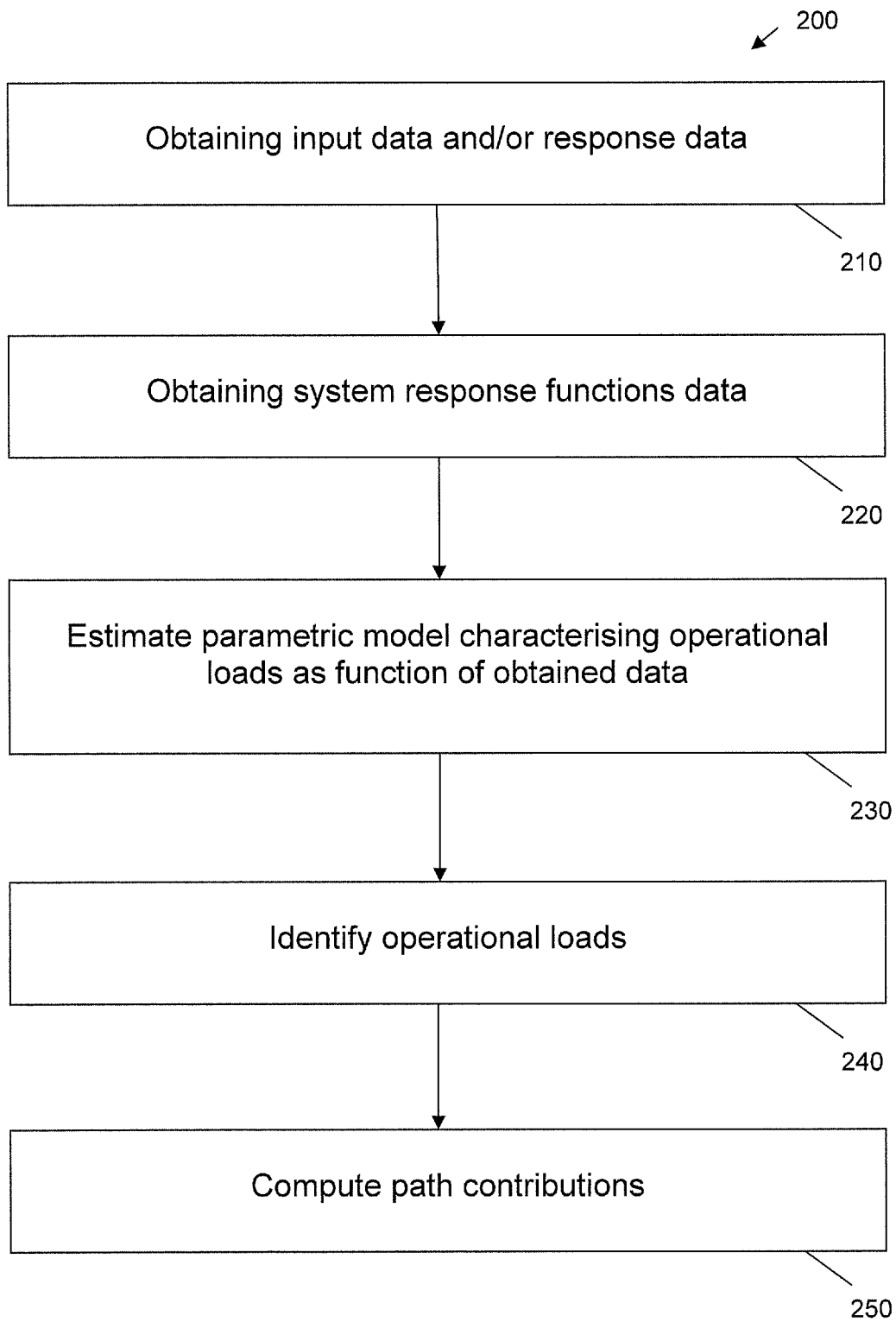
FIG. 3 is a schematic representation of a method for obtaining vibrational and/or acoustical data according to embodiments of the present invention.

By way of illustration, embodiments of the present invention not being limited thereto, an example of a method 200 according to an embodiment of the present invention is shown in FIG. 3, indicating standard and optional steps. It is to be noticed that, although the method has been illustrated using given mathematical formalisms (equation algebraic, matrix algebraic), the present invention is not limited hereto but only provided by way of example. It further is to be noticed that the system response functions may represent a transfer function in the frequency domain as well as in the time domain. For the ease of explanation, the following exemplary method and the examples indicated below, especially the equations cited, as well as the system described in FIG. 2 have been expressed in the frequency domain. It is to be understood that similar exemplary methods, examples and systems may be provided also for the time domain.

In a first step 210, the method 200 for characterisation of vibrational and/or acoustic transfer path related data of a physical system comprises receiving input data and/or response data regarding the physical system. The data may be operational data. The latter may be obtained by measurement on the physical system, e.g. in a lab environment but preferably in-situ as this avoids the necessity to demount or build a special test set, or it may be obtained from a simulation of the physical system. The data thus may be measured or simulated data. The data may be obtained from a memory, e.g. measured previously in a system, or it may be directly measured at the system. The measurements may for example be a measurement during a single run-up or run-down or several of these measurements at different conditions (various throttles, gears, etc.) may be executed. The appropriate measurements to be performed may depend on the conditions for which the TPA analysis needs to be done. During the operational measurements, some or all mount accelerations and pressure inputs and/or some or all responses at the target points and indicators may be measured synchronously or simulated. Tracked phase-referenced spectra may be calculated to perform the analysis. Or alternatively, order components may be tracked for some or all measured input and response channels. This is typically done in case of non-stationary measurements with changing rotational speed such as e.g. in a run-up or run-down. Strictly, only the orders of interest need to be processed. However, the more orders are used for estimating the parametric load models, the more robust the model parameters can be estimated and the more accurate the path contributions can be derived. Different methods for tracking orders are known in the field.

In a second step 220, the method 200 comprises receiving system response functions for the system. The system response function may be a system response function expressing the system response between the at least one input point and the at least one response point. The system response function may be expressed either in the time domain or in the frequency domain. The system response function in the frequency domain may for example be a frequency response function, whereas in the time domain it may act as a filter, e.g. a mathematical filter. The system response function may be measured or simulated between input points and response points. It may mathematically express the transfer of the loads to the responses, i.e. to the indicators or the targets. In case of soft mounts, the system response function measurements may be carried out without dismounting the active system. The latter is advantageous as it reduces the amount of work required for obtaining such system response functions. The system response functions may be measured in a direct or reciprocal way. It is an advantage of using reciprocal measurements that only one excitation is needed per target point while the direct approach requires one excitation per input load. It is also an advantage of using reciprocal measurements that a good accuracy can be obtained, as it overcomes the problem that due to the limited space at the path inputs the direction errors in direct system response function measurements may be up to 10 dB. It is to be noticed that the first and second step may be performed in the above-described order, in reverse order or simultaneously.

As indicated in FIG. 2, the physical system under study may comprise an active part generating the structural and acoustic loads and a passive part reacting to these loads. A typical example of such a structure may for example be a vehicle body on which a power-train, e.g. an engine, intake, exhaust, etc. is mounted. Such a power-train could then for example be an active part of the system, while the vehicle body with the passenger compartment is the passive component. In order to identify the noise transfer paths from the active system component(s), through the physical connection elements (e.g. mounts, etc.) and/or along airborne pathways, to the target point(s) of interest, a number of variables may be measured. Such variables may comprise different types of variables or a combination thereof. A first example of variables that may be measured are targets such as for example pressures and/or accelerations. These may be represented as $y_1(\omega), \ldots, y_k(\omega), \ldots, y_u(\omega)$. Another example of variables that may be determined are path inputs, also called references. Such path inputs may for example be active and/or passive side accelerations for mount connections as can be represented by $a_{a1}(\omega), \ldots, a_{ai}(\omega), \ldots, a_{an}(\omega)$ and $a_{p1}(\omega), \ldots, a_{pi}(\omega), \ldots, a_{pn}(\omega)$. They may also be pressures for acoustic loads, measured near vibrating surfaces, nozzles, apertures, etc. and represented by $p_1(\omega), \ldots, p_j(\omega), \ldots, p_p(\omega)$. Another example of variables that may be used are indicators, such as for example pressures and/or accelerations. The latter may be represented by $u_1(\omega), \ldots, u_l(\omega), \ldots, u_v(\omega)$. Another example of variables that may be measured are system response functions from the path inputs to the target and/or indicator response points. Yet another example of variables that may be used are tacho signals (pulse train, RPM) or phase references.

In a third step 230, the method comprises applying at least one parametric model characterising at least one load on the physical system as a function of data at the at least one input point. The at least one load characterised by the at least one parametric model may be a force and/or an acoustic load. The at least one parametric model thereby is based on the input data and/or the response data and on the physical system response functions. The at least one parametric model for structural and/or acoustic loads may be applied to estimate the structural and/or acoustic loads. The parametric models may have a physically meaningful interpretation. The parametric models may be models characterising loads as a function of input data or data derived therefrom at the at least one input point. The latter may be mathematically expressed as $$F_i(\omega) = f(\text{fmodel parameters, input data}) \qquad [5]$$

with $F_i(\omega)$ a force, e.g. operational force, which is estimated by the parametric model f being a parametric function of the input data and/or as $$Q_j(\omega) = g(\text{gmodel parameters, input data}) \qquad [6]$$

with $Q_j(\omega)$ an acoustic load, which is estimated by the parametric model g being a parametric function of the input data. In a particular example, the operational force may for example be a function of the active and passive side mount accelerations, which may be expressed as $$F_i(\omega) = f(\text{fmodel parameters}, a_{ai}(\omega), a_{pi}(\omega)) \qquad [7]$$

and/or the acoustic load may be a function of a pressure path input which may be expressed as $$Q_j(\omega) = g(\text{gmodel parameters}, p_j(\omega)). \qquad [8]$$

The method may cover any type of parametric model characterising the operational loads as a function of the path inputs. By way of illustration, the present invention not being limited thereto, a number of examples is shown below, indicating some models that may be used. The parametric models that may be used may for example be single degree of freedom mount models, higher degree of freedom mount models, mount models with linearly increasing stiffness, specific models for hydromounts, constant point mobility models, band estimator models, etc. A priori known relations among the parameters may be taken into account to reduce the number of parameters to be estimated and obtain a better conditioning.

The target response data can then be described as a sum of different path contributions, each associated with a parametric model of a force and/or acoustic load, i.e.

$$y_k(\omega) = \sum_{i=1}^{n} SRF_{ik}(\omega) * F_i(\text{fmodel parameters, input data}) + \sum_{j=1}^{p} SRF_{jk}(\omega) * Q_j(\text{gmodel parameters, input data}) \qquad [9]$$

Here, $y_k(\omega)$ is the pressure or acceleration response at target point k, $\omega$ is the frequency, $F_i$ (i=1, ..., n) are the operational forces, $Q_j$ (j=1, ..., p) are the operational volume accelerations representing the acoustic noise sources, and finally, $SRF_{ik}$ and $SRF_{jk}$ are the transfer path SRF's to target point k, in the present equation indicated as frequency response functions. It is to be noticed that instead of system response functions in the frequency domain, system response functions also may be expressed in the time domain. The obtained transfer path then may also be obtained in the time domain.

For a given number of input data, response data and system response functions, the above equation gives rise to a system of equations that can be solved for the model parameters (fmodel parameters, gmodel parameters) using conventional mathematical techniques, for example mathematical solution methods for solving linear systems of equations such as least square solutions. The latter therefore results in known model parameter values. It is clear that the more input information will be used, e.g. the more orders and responses that may be used, the more accurate the model parameter estimations can be. Furthermore, the use of a balancing factor to scale the order components and the structural and acoustic terms helps improving the model parameter estimations. The obtained model parameter values may allow determining additional information regarding the noise transfer in the system. For example, the loads may be expressed using a parametric model including an estimate of some physical parameters of the system, such as for example the mount stiffness. The latter may also be information of interest. The models for the loads as such also may be useful transfer path related data, which may be used in different applications.

In an optional fourth step 240, the loads may be determined based on the obtained model parameter values and the input data by substituting the obtained model parameter values in equations [5, 6], resulting in determination of the structural forces $$F_i(\omega) = f(f\text{model parameters values, input data}) \quad [10]$$

and acoustic loads $$Q_j(\omega) = g(g\text{model parameters values, input data}) \quad [11]$$

The latter may be useful transfer path related data, which may be used in different applications.

According to a further optional fifth step, computation of the path contributions may be performed, for example per frequency or per order component, the present invention not being limited hereto. Thus, once the operational loads are identified, the path contributions can be calculated for each target point k, by combining the loads with their corresponding system response function. This is achieved by a convolution in the time domain or by a multiplication in the frequency domain. The latter may for example be performed as given by the following equation, expressing the conventionally used transfer path analysis formulation, where each of the targets is described as the sum of different path contributions, each associated with a structural or acoustic load:

$$y_k(\omega) = \sum_{i=1}^{n} SRF_{ik}(\omega) * F_i(\omega) + \sum_{j=1}^{p} SRF_{jk}(\omega) * Q_j(\omega) \quad [12]$$

Figure 4:
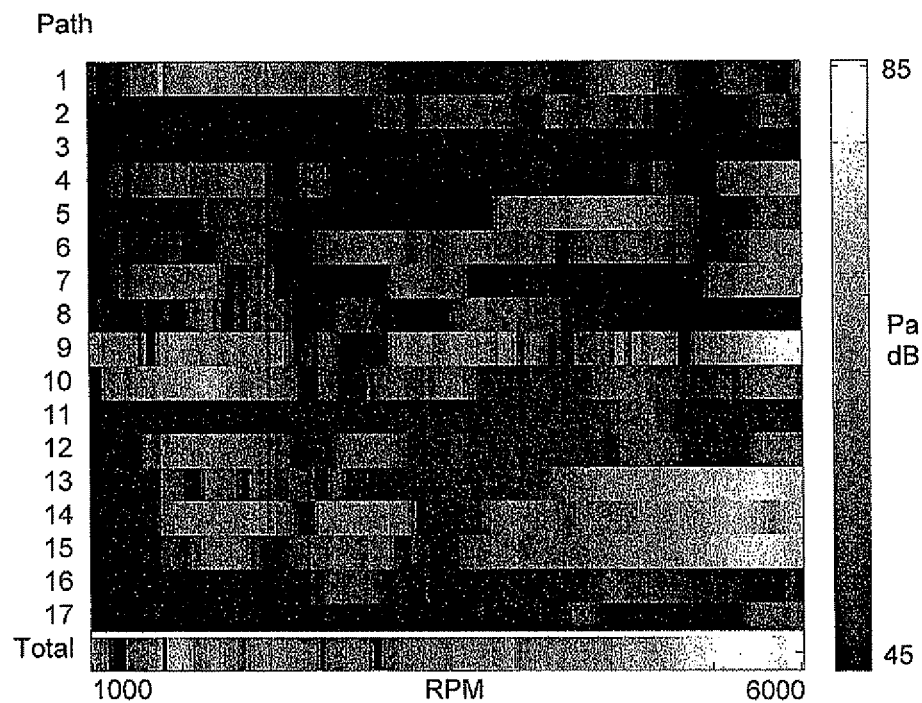
FIG. 4 is a schematic representation of a graphic visualisation of a Transfer Path Analysis.

Determination of the path contributions may be performed in a way similar to computation of the path contributions in existing TPA methods. Visualizations of the path contributions may result in allowing to assess critical transfer paths and frequency regions and/or in proposing modifications of, for example, mount stiffness characteristics, transfer path SRF's, etc. By way of example, the present invention not being limited thereto, an illustration of an obtainable visualisation of noise transfer path information is shown in FIG. 4.

It is an advantage of embodiments of the present invention that it targets both structural and acoustic loads.

It is an advantage of embodiments of the present invention that the identification of the parametric models from the operational data and the system response functions can be based either on targets, extra indicators or a combination thereof.

It is an advantage of embodiments according to embodiments of the present invention that structural and airborne path contributions can be identified either separately or simultaneously.

It also is an advantage of embodiments according to the present invention that the type and characteristics of the parametric model as well as the number and type of response data (e.g. targets and/or indicators, number of orders taken into account, etc.) as well as the application of a separate or simultaneous identification of structural and airborne contributions, with or without balancing, can be decided by the user.

According to further aspects of the present invention, the parametric models, the determined loads, the transfer path contributions or other obtained information regarding the physical system may be used for optimizing the design of systems, e.g. for improving the sound quality or reducing noise in physical systems. The obtained information also may be used for simulation or analysis purposes.

Figure 5:
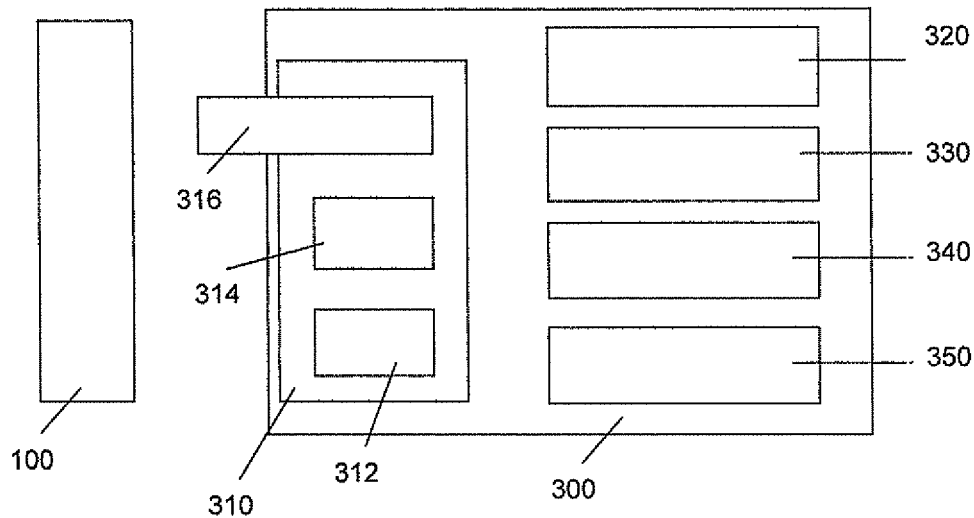
FIG. 5 is a schematic representation of a system adapted for providing vibrational and/or acoustical data according to embodiments of the present invention.

In a further aspect, the present invention relates to a characterization system for performing characterization of vibrational and/or acoustic transfer path related data of a physical system. The system may be made in hardware as well as in software, in the latter case being suitable for operating on a computing device. By way of illustration, the present invention not being limited thereto, an example of a characterization system according to an embodiment of the present invention is shown in FIG. 5, showing standard and optional components. The characterization system 300 comprises an input means 310 adapted for receiving in-situ input data and/or response data regarding the physical system. The latter may comprise an input port 312 for receiving data from a stored position, e.g. from a memory, which may for example be a data port, or an input unit 314 for putting in the data manually by a user. The input means 310 alternatively or in addition thereto may comprise a measurement means 316 for measuring the input data and/or response date regarding the physical system directly or indirectly from the physical system 100. The input means 310 may also be adapted for receiving system response function data. Such system response function may be representative of the transfer of vibration and/or acoustic signals between at least one input point and at least one response point. The characterization system furthermore may comprise a processing means 320 adapted for applying at least one parametric model characterizing at least one load on the physical system as a function of input data at the at least one input point. The system may be adapted to apply a parametric model that takes into account the input data and/or the response data and the at least one system response function. The system furthermore may comprise a separate processing means 330 for or the above processing means may be adapted for determining values for the load based on said input and/or response data and on said system response function and based on said at least one parametric model. The system optionally also may comprise a processing means 340 for or the above processing means also may be adapted for determining therefrom path contributions that may occur. The processing means 320, 330 and/or 340 may be any suitable processor such as for example a microprocessor, a digital signal processing device, a programmable digital logic device such as a Programmable Array Logic (PAL), a Programmable Logic Array, a Programmable Gate Array or a Field Programmable Gate Array (FPGA), etc. One or more of the different processing steps may for example be based on a predetermined algorithm, based on predetermined rules, based on neural networking, based on a predetermined mathematical method, etc. The characterization system 300 furthermore may be adapted to provide one, some or all functionalities of the method steps as described in embodiments of the above-described aspects of the present invention. The system furthermore may comprise an output means 350 for outputting the obtained transfer path related data. Such an output means 350 may be a visualisation means for visualising the obtained results, or it may be a data port for providing output to an external component. Such information may be adapted to be provided as input data for a simulation system.

Figure 6:
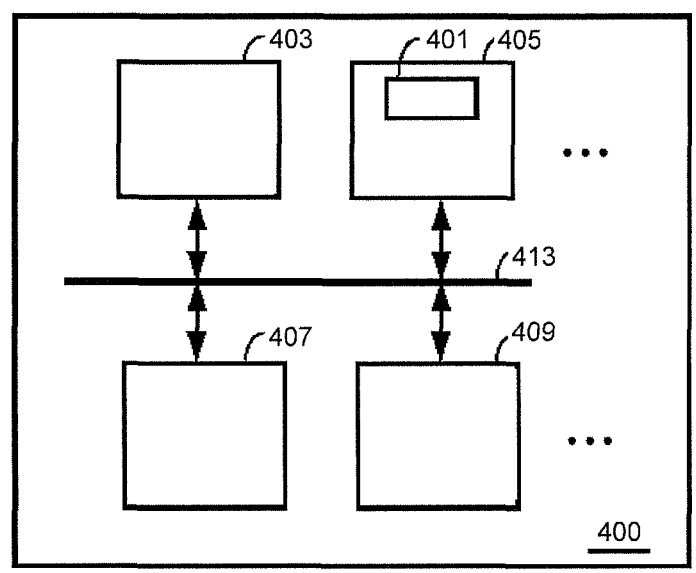
FIG. 6 is a computer system as can be used for implementing a method for obtaining vibrational and/or acoustical data according to embodiments of the present invention.

The above-described method embodiments related to characterisation of vibrational and/or acoustic transfer path related data of a physical system as described in the present invention may be implemented in a processing system 400, also referred to as computing means, such as shown in FIG. 6. FIG. 6 shows one configuration of processing system 400 that includes at least one programmable processor 403 coupled to a memory subsystem 405 that includes at least one form of memory, e.g., RAM, ROM, and so forth. It is to be noted that the processor 403 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system 400 according to the present embodiment thus may be adapted for receiving input data and/or response data regarding the physical system and for receiving system response functions between the at least one input point and the at least one response point. The processing system 400 also is adapted for applying parametric models characterising loads on the physical system as a function of signals at the at least one input point, whereby the parametric models are estimated based on the input data and/or response data and on the physical system response functions.

Ports for inputting and outputting data may be included in the image processing means. The processing system may include a storage subsystem 407 that has at least one disk drive and/or CD-ROM drive and/or DVD drive. In some implementations, a display system, a keyboard, and a pointing device may be included as part of a user interface subsystem 409 to provide for a user to manually input information. More elements such as network connections, interfaces to various devices, and so forth, may be included, but are not illustrated in FIG. 6. The various elements of the processing system 400 may be coupled in various ways, including via a bus subsystem 413 shown in FIG. 6 for simplicity as a single bus, but will be understood to those in the art to include a system of at least one bus. The memory of the memory subsystem 405 may at some time hold part or all, in either case shown as 411, of a set of instructions that when executed on the processing system 400 implement the steps of the method embodiments described herein. Thus, while a processing system 400 such as shown in FIG. 6 is prior art, a system that includes the instructions to implement aspects of the methods for characterising vibrational and/or acoustic transfer path related data according to embodiments of the present invention is not prior art, and therefore FIG. 6 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

By way of illustration, the present invention not being limited thereto, a number of examples is provided to show some features and advantages of embodiments according to the present invention.

The first example illustrates the use of a minimally parameterized model for the forces and acoustic loads. Such model allows identifying structural and airborne transfer paths simultaneously from the target(s) only, requiring a minimum of SRF measurement efforts. No additional indicators therefore are necessary.

The example assumes flexible mounts with smooth mount stiffness profile. A single degree of freedom (SDOF) mount model is used to describe the operational forces:

$$F_i(\omega) = K_i(\omega) * \frac{(a_{ai}(\omega) - a_{pi}(\omega))}{-\omega^2} \qquad [13]$$

where $$K_i(\omega) = -m_i*\omega^2 + j*c_i*\omega + k_i \qquad [14]$$

where, $m_i$, $c_i$ and $k_i$ are respectively the mass, damping and stiffness of mount i. These parameters have a physically meaningful interpretation and can be forced to be real values. The SDOF model covers the full frequency range of the analysis under study.

A constant point mobility model is assumed for the acoustic loads, with $\theta_j$ a complex, frequency-independent value:

$$Q_j(\omega) = \theta_j * p_j(\omega) \qquad [15]$$

By way of illustration, the present example will be further discussed according to the different steps set forth in the exemplary method illustrated in FIG. 3. The system response function measurements and operational measurements may be as set out in steps 1 and 2 of the exemplary method.

The estimation of the parametric models for the structural and acoustic loads, i.e. step 3 of the exemplary method, according to the present example is performed assuming a SDOF mount stiffness model and a constant point mobility for the acoustic loads. Substituting equations [13], [14] and [15] into the classical TPA formulation [12], where each of the targets is described as the sum of different path contributions, each associated with a structural or acoustic load, results in $$y_k(\omega) = \sum_{i=1}^{n} SRF_{ik}(\omega) * (-m_i * \omega^2 + j * c_i * \omega + k_i) * \frac{(a_{ai}(\omega) - a_{pi}(\omega))}{-\omega^2} + \sum_{j=1}^{p} SRF_{jk}(\omega) * \theta_j * p_j(\omega)$$

[16]

or, $$y_k(\omega) = \sum_{i=1}^{n} m_i * (-\omega^2 * G_{ik}(\omega)) + c_i * (j * \omega * G_{ik}(\omega)) + k_i * G_{ik}(\omega) + \sum_{j=1}^{p} \theta_j * G_{jk}(\omega)$$

[17]

where, $$G_{ik}(\omega) = SRF_{ik}(\omega) * \frac{(a_{ai}(\omega) - a_{pi}(\omega))}{-\omega^2}$$

[18]

$$G_{jk}(\omega) = SRF_{jk}(\omega) * p_j(\omega)$$

[19]

Suppose we have m orders and r RPM points per order, then the following system of equations can be derived:

$$[A_k]_{(m*r) \times ((n*3)+p)} \cdot [X]_{((n*3)+p) \times 1} = [B_k]_{(m*r) \times 1}$$

[20]

where, $$[A_k] = \begin{bmatrix}
\begin{array}{|cccc|cc|}
\hline
\multicolumn{4}{|c|}{=\text{structural paths}} & \multicolumn{2}{c|}{=\text{airborne paths}} \\
\hline
\ldots & -\omega_{11}^2 * G_{ik}(\omega_{11}) & j*\omega_{11}*G_{ik}(\omega_{11}) & G_{ik}(\omega_{11}) \ldots & \ldots & G_{jk}(\omega_{11}) \ldots \\
\ldots & -\omega_{21}^2 * G_{ik}(\omega_{21}) & j*\omega_{21}*G_{ik}(\omega_{21}) & G_{ik}(\omega_{21}) \ldots & \ldots & G_{jk}(\omega_{21}) \ldots \\
& \vdots & \vdots & \vdots & & \vdots \\
\ldots & -\omega_{r1}^2 * G_{ik}(\omega_{r1}) & j*\omega_{r1}*G_{ik}(\omega_{r1}) & G_{ik}(\omega_{r1}) \ldots & \ldots & G_{jk}(\omega_{r1}) \ldots \\
\hline
\ldots & -\omega_{12}^2 * G_{ik}(\omega_{12}) & j*\omega_{12}*G_{ik}(\omega_{12}) & G_{ik}(\omega_{12}) \ldots & \ldots & G_{jk}(\omega_{12}) \ldots \\
\ldots & -\omega_{22}^2 * G_{ik}(\omega_{22}) & j*\omega_{22}*G_{ik}(\omega_{22}) & G_{ik}(\omega_{22}) \ldots & \ldots & G_{jk}(\omega_{22}) \ldots \\
& \vdots & \vdots & \vdots & & \vdots \\
\ldots & -\omega_{r2}^2 * G_{ik}(\omega_{r2}) & j*\omega_{r2}*G_{ik}(\omega_{r2}) & G_{ik}(\omega_{r2}) \ldots & \ldots & G_{jk}(\omega_{r2}) \ldots \\
\hline
& \vdots & \vdots & \vdots & & \vdots \\
\hline
\ldots & -\omega_{1m}^2 * G_{ik}(\omega_{1m}) & j*\omega_{1m}*G_{ik}(\omega_{1m}) & G_{ik}(\omega_{1m}) \ldots & \ldots & G_{jk}(\omega_{1m}) \ldots \\
& \vdots & \vdots & \vdots & & \vdots \\
\ldots & -\omega_{2m}^2 * G_{ik}(\omega_{2m}) & j*\omega_{2m}*G_{ik}(\omega_{2m}) & G_{ik}(\omega_{2m}) \ldots & \ldots & G_{jk}(\omega_{2m}) \ldots \\
\ldots & -\omega_{rm}^2 * G_{ik}(\omega_{rm}) & j*\omega_{rm}*G_{ik}(\omega_{rm}) & G_{ik}(\omega_{rm}) \ldots & \ldots & G_{jk}(\omega_{rm}) \ldots \\
\hline
\end{array}
\end{bmatrix}
\begin{array}{l} = \text{order } 1 \\ \\ \\ \\ = \text{order } 2 \\ \\ \\ \\ = \text{order } m \end{array}$$

$$[B_k] = \begin{bmatrix} \begin{bmatrix} y_k(\omega_{11}) \\ y_k(\omega_{21}) \\ \vdots \\ y_k(\omega_{r1}) \end{bmatrix} & = \text{order } 1 \\ \begin{bmatrix} y_k(\omega_{12}) \\ y_k(\omega_{22}) \\ \vdots \\ y_k(\omega_{r2}) \end{bmatrix} & = \text{order } 2 \\ \vdots \\ \begin{bmatrix} y_k(\omega_{1m}) \\ y_k(\omega_{2m}) \\ \vdots \\ y_k(\omega_{rm}) \end{bmatrix} & = \text{order } m \end{bmatrix}$$

$$[X] = \begin{bmatrix} \begin{bmatrix} \vdots \\ m_i \\ c_i \\ k_i \\ \vdots \end{bmatrix} & = \text{structural paths} \\ \vdots \\ \begin{bmatrix} \theta_j \\ \vdots \end{bmatrix} & = \text{airborne paths} \end{bmatrix}$$

$$\text{and } \omega_{xy} = o_y * \frac{RPM_x}{60}$$

with $o_y$ the order number (y=1, ..., m) and $RPM_x$ the rotational speed (x=1, ..., r). If more target responses are available (k=1, ..., u), equation [20] becomes as follows:

$$[A]_{(m*r*u)\times((n*3)+p)} \cdot [X]_{((n*3)+p)\times 1} = [B]_{(m*r*u)\times 1} \quad [21]$$

The Least Squares (LS) solution of this linear system of equations is:

$$[X] = [A]^{-1} * [B] \quad [22]$$

where $A^{-1}$ is the pseudo-inverse of matrix A and X is the solution vector with estimated parameters $m_i$, $c_i$, $k_i$ (i=1, ..., n) and $\theta_j$ (j=1, ..., p).

Finally, the mount stiffness profiles can be calculated as in equation [23]. This ability of estimating mount stiffness profiles from in-situ TPA measurements is an interesting by-product of the present invention.

$$K_1(\omega) = -m_1 * \omega^2 + j * c_1 * \omega + k_1$$

$$K_2(\omega) = -m_2 * \omega^2 + j * c_2 * \omega + k_2$$

$$K_n(\omega) = -m_n * \omega^2 + j * c_n * \omega + k_n \quad [23]$$

The model parameter estimations become more robust when more order components and targets are included in the system of equations. By doing so, the parameter estimates are less sensitive to any sort of errors (e.g. SRF measurement errors, order tracking errors, measurement noise, etc.).

Furthermore, if a priori information is available (e.g. stiffness profile of a mount is known, mount stiffness values in x- and y-direction are known to be similar, etc.), it is recommended to include it in the system of equations. By doing so, one can remove or combine some of the columns of matrix A in equation [21] and reduce the number of parameters to be estimated. This again increases the robustness of the solution.

One can also make assumptions. For example, when the system of equations contains only lower frequencies, e.g. to troubleshoot a low-frequency booming problem, one can be sure that the mass effect of the mounts will not play a role and set it to zero.

Finally, it is recommended to use balancing factors to weight the structural and acoustic terms and to weight the different order components. This is important to improve the parameter estimations.

In an optional fourth step, the operational loads are identified. The operational input forces and volume accelerations are calculated per order: For the structural paths (i=1, ..., n) with acceleration references:

$$F_i(\omega_{xy}) = K_i(\omega_{xy}) * \frac{(a_{ai}(\omega_{xy}) - a_{pi}(\omega_{xy}))}{-\omega_{xy}^2} \quad [24]$$

For the acoustic loads (j=1, ..., p):

$$Q_j(\omega_{xy}) = \theta_j * p_j(\omega_{xy}) \quad [25]$$

In a fifth step, the computation of the path contributions per order can be performed, for example as indicated in the method example.

In a second example, the use of a band estimator model to characterize the operational forces is illustrated. The model is estimated from close by acceleration indicators, allowing a separate identification of the structural path contributions without the need to consider the acoustic loads. This band estimator model assumes a constant mount stiffness per frequency band. Mathematically, this is expressed as follows $$F_i(\omega) = K_i(\omega) * \frac{(a_{ai}(\omega) - a_{pi}(\omega))}{-\omega^2} \quad [26]$$

where $K_i(\omega) = k_i$ is constant per frequency band.

The width of the frequency bands is to be defined by the user. If wide frequency bands are used, the estimated mount stiffness profiles are relatively smooth and the path contribution results tend towards those of the SDOF estimator. In case narrow frequency bands are used, the estimated stiffness profiles are more nervous and the path contribution results tend towards those of the inverse force identification method.

The stiffness values $k_i$ per frequency band are, in this example, estimated from nearby acceleration indicators different from the target(s). In this way, structural path contributions can be estimated separately from the airborne contributions. By increasing the number of acceleration indicators, the user can take smaller frequency bands and obtain better mount stiffness estimates. The advantage of taking small frequency bands is that dominant path contributions at certain frequencies only have limited influence on the stiffness estimations in other frequency regions.

Per frequency band s, characterized by a lower limit and upper limit frequency, the following equations can be formulated for each measured indicator I:

$$u_l(\omega) = \sum_{i=1}^{n} SRF_{il}(\omega) * F_i(\omega) \quad [27]$$

$$= \sum_{i=1}^{n} SRF_{il}(\omega) * k_i * \frac{(a_{ai}(\omega) - a_{pi}(\omega))}{-\omega^2}$$

$$= \sum_{i=1}^{n} k_i * G_{il}(\omega)$$

where $G_{il}(\omega) = SRF_{il}(\omega) * \frac{(a_{ai}(\omega) - a_{pi}(\omega))}{-\omega^2} \quad [28]$ For m orders and r RPM points per order in the frequency band s, the following system equations are obtained:

$$[A_l]_{(m*r) \times n} \cdot [X]_{n \times 1} = [B_l]_{(m*r) \times 1} \quad [29]$$

where, $$[A_l] = \begin{bmatrix} \text{=structural paths} \\ \begin{bmatrix} \cdots & G_{il}(\omega_{11}) & \cdots \\ \cdots & G_{il}(\omega_{21}) & \cdots \\ \vdots & \vdots & \vdots \\ \cdots & G_{il}(\omega_{r1}) & \cdots \end{bmatrix} = \text{order } 1 \\ \begin{bmatrix} \cdots & G_{il}(\omega_{12}) & \cdots \\ \cdots & G_{il}(\omega_{22}) & \cdots \\ \vdots & \vdots & \vdots \\ \cdots & G_{il}(\omega_{r2}) & \cdots \end{bmatrix} = \text{order } 2 \\ \vdots \\ \begin{bmatrix} \cdots & G_{il}(\omega_{1m}) & \cdots \\ \cdots & G_{il}(\omega_{2m}) & \cdots \\ \vdots & \vdots & \vdots \\ \cdots & G_{il}(\omega_{rm}) & \cdots \end{bmatrix} = \text{order } m \end{bmatrix}$$

$$[B_l] = \begin{bmatrix} \begin{bmatrix} u_l(\omega_{11}) \\ u_l(\omega_{21}) \\ \vdots \\ u_l(\omega_{r1}) \end{bmatrix} = \text{order } 1 \\ \begin{bmatrix} u_l(\omega_{12}) \\ u_l(\omega_{22}) \\ \vdots \\ u_l(\omega_{r2}) \end{bmatrix} = \text{order } 2 \\ \vdots \\ \begin{bmatrix} u_l(\omega_{1m}) \\ u_l(\omega_{2m}) \\ \vdots \\ u_l(\omega_{rm}) \end{bmatrix} = \text{order } m \end{bmatrix}$$

$$[X] = \begin{bmatrix} \vdots \\ k_i \\ \vdots \end{bmatrix} = \text{structural paths}$$

and $\omega_{s,min} \leq \omega_{xy} \leq \omega_{s,max}$

Similar equations can be written for all indicator points (I=1, ..., v). All combined give:

$$[A]_{(m*r*v) \times n} \cdot [X]_{n \times 1} = [B]_{(m*r*v) \times 1} \quad [30]$$

The LS solution of this system of equation is:

$$[X] = \begin{bmatrix} k_1 \\ k_2 \\ \vdots \\ k_n \end{bmatrix} = [A]^{-1} * [B] \quad [31]$$

where $A^{-1}$ is the pseudo-inverse of matrix A and $k_1, k_2, \ldots, k_n$ are the mount stiffness estimates for frequency band s.

The system of equations in equation [31] can be formulated and solved for each frequency band s. By doing so, we obtain the mount stiffness profiles for the full frequency range of the TPA analysis under study. By combining these mount stiffness profiles with the operational accelerations at both active and passive side of the mounts, the operational forces are obtained. Multiplying these with the according transfer path SRF's gives the transfer path contributions for the targets of interest.

For rigid connections, typically only the passive side accelerations are used, as the differential response across these connections is very small. So here:

$$F_i(\omega) = K_i(\omega) * \frac{a_{pi}(\omega)}{\omega^2} \quad [32]$$

where $K_i(\omega)$ is to be interpreted here as a point mobility which is assumed to be a constant in each considered frequency band s. Typically, in such example with rigid connections, relatively small frequency bands are used to estimate the point mobilities $k_i$, requiring somewhat more acceleration indicators. Indeed, the smaller the frequency bands, the more parameters to be estimated and the more data required to avoid ill-conditioning problems. In the extreme case, when using (i) frequency bands of a only one spectral line, ii) a single order and (iii) twice as many indicator points as structural loads, the path contribution results converge to those of the inverse force identification method.

It is to be understood that although preferred embodiments, specific constructions and configurations, as well as materials, have been discussed herein for devices according to the present invention, various changes or modifications in form and detail may be applied. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for characterization of vibrational and acoustic transfer path data of a physical system, the physical system comprising at least one path input point and at least one response point, the method comprising the steps of:
receiving in-situ path input data for at least one path input point and/or response data for at least one response point of the physical system, wherein the path input data and/or response data are operational data measured directly at the physical system during operation;
measuring and/or simulating at least one physical system response function (SRF) between the at least one path input point and the at least one response point; and
identifying at least one parametric load model characterizing structural and acoustic loads acting on the physical system as a function of said path input data through the at least one response point during operation of the physical system,
wherein the at least one parametric load model is identified by estimating the parametric load model directly from at least one of the path input data and the response data by using a single degree of freedom mount stiffness model in combination with the at least one SRF for the structural load and using a constant point mobility model in combination with the at least one SRF for the acoustic load.

2. The method according to claim 1, wherein said at least one parametric load model comprises a plurality of model parameters, and wherein determining the structural and acoustic loads on the physical system comprises determining values for said model parameters based on an expression correlating the at least one response on the one hand and a product of the at least one system response function with the path input data for the at least one path input point on the other hand.

3. The method according the claim 1, wherein said method furthermore comprises determining transfer path contributions for at least one of said at least one response point from said identified path input loads and said physical system response functions.

4. The method according to claim 1, wherein the parametric load model is a physical model of the system.

5. The methods according to claim 1, wherein any of the type and characteristics of the at least on parametric load model, the type and number of response data and application of either separate or simultaneous identification of structural and airborne contributions is user-specified.

6. The method according to claim 1, wherein the in-situ path input is received through mount connections.

7. A characterization system for characterizing vibrational and/or acoustic transfer path related data of a physical system, the physical system comprising at least one path input point and at least one response point, the characterization system comprising:
an input system arranged to receive in-situ path input data for at least one path input point and/or response data for at least one response point of the physical system, wherein the path input data and/or response data are operational data measured directly at the physical system during operation, and to receive at least one system response function (SRF) between the at least one path input point and the at least one response point; and
a processing system arranged to identify at least one parametric load model characterizing structural and acoustic loads acting on the physical system as a function of said path input data through the at least one response point during operation of the physical system, wherein the parametric load model is estimated directly from and at least one of the path input data and response data using a single degree mount stiffness model in combination with the at least one SRF for the structural load and a constant point mobility model in combination with the at least one SRF for the acoustic load.

8. A non-transitory memory medium comprising executable program instructions that, when executed, cause a processing system to perform a method for characterization of vibrational and acoustic transfer path related data of a physical system, the physical system having at least one path input point and at least one response point, by performing the steps of:
receiving in-situ path input data for at least one path input point and/or response data for at least one response point of the physical system, wherein the path input data and/or response data are operational data measured directly at the physical system during operation;

measuring and/or simulating at least one physical system response function (SRF) between the at least one path input point and the at least one response point; and identifying at least one parametric load model characterizing structural and acoustic loads acting on the physical system as a function of said path input data through the at least one response point during operation of the physical system, wherein the at least one parametric load model is identified by estimating the parametric load model directly from at least one of the path input data and the response data by using a single degree of freedom mount stiffness model in combination with the at least one SRF for the structural load and using a constant point mobility model in combination with the at least one SRF for the acoustic load.

* * * * *